(12) United States Patent
Wang et al.

(10) Patent No.: US 9,885,926 B2
(45) Date of Patent: Feb. 6, 2018

(54) SLIT ELECTRODE, ARRAY SUBSTRATE AND DISPLAY DEVICE

(71) Applicant: BOE TECHNOLOGY GROUP CO., LTD., Beijing (CN)

(72) Inventors: Qiangtao Wang, Beijing (CN); Hyunsic Choi, Beijing (CN); Zheng Fang, Beijing (CN); Yunyun Tian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/435,996

(22) PCT Filed: Jul. 30, 2014

(86) PCT No.: PCT/CN2014/083309
§ 371 (c)(1),
(2) Date: Apr. 15, 2015

(87) PCT Pub. No.: WO2015/158062
PCT Pub. Date: Oct. 22, 2015

(65) Prior Publication Data
US 2017/0038647 A1 Feb. 9, 2017

(30) Foreign Application Priority Data
Apr. 18, 2014 (CN) .......................... 2014 1 0158760

(51) Int. Cl.
*G02F 1/1343* (2006.01)
*G02F 1/1333* (2006.01)

(52) U.S. Cl.
CPC .. *G02F 1/134327* (2013.01); *G02F 1/133345* (2013.01); *G02F 1/134336* (2013.01);
(Continued)

(58) Field of Classification Search
CPC ......... G02F 1/134345; G02F 1/134372; G02F 1/134363
See application file for complete search history.

(56) References Cited

U.S. PATENT DOCUMENTS 9,395,591 B2 * 7/2016 Shao ................. G02F 1/134363
2005/0179844 A1 * 8/2005 Roosendaal ...... G02F 1/134309
349/139
(Continued)

FOREIGN PATENT DOCUMENTS

| CN | 1653382 | 8/2005 |
|---|---|---|
| CN | 1653382 A | 8/2005 |

(Continued)

OTHER PUBLICATIONS

Office Action in Chinese Application No. 2014101587605 with English translation. 12 pages.
(Continued)

*Primary Examiner* — Timothy L Rude
(74) *Attorney, Agent, or Firm* — Blakely Sokoloff Taylor & Zafman LLP

(57) ABSTRACT

The present invention discloses a slit electrode for solving the problem that the process margin of the existing slit electrode is relatively low. The slit electrode provided by the present invention comprises: at least one slit electrode unit, the slit electrode unit comprising a plurality of strip electrodes, a slit being provided between two adjacent strip electrodes; wherein each strip electrode has a given average width, the average widths of at least two strip electrodes in the slit electrode unit are not equal. The present invention further discloses an array substrate comprising the slit electrode and a display device.

16 Claims, 9 Drawing Sheets

(52) U.S. Cl.
CPC ............ *G02F 1/134363* (2013.01); *G02F 2001/134345* (2013.01); *G02F 2001/134372* (2013.01); *G02F 2201/121* (2013.01); *G02F 2201/123* (2013.01)

(56) References Cited

U.S. PATENT DOCUMENTS

| | | | | |
|---|---|---|---|---|
| 2011/0181824 | A1 | 7/2011 | Nagano | |
| 2015/0198855 | A1* | 7/2015 | Kim | G02F 1/141 349/33 |
| 2015/0301411 | A1* | 10/2015 | Morishita | G02F 1/134309 349/33 |
| 2015/0338708 | A1* | 11/2015 | Li | G02F 1/133707 349/139 |
| 2016/0060522 | A1* | 3/2016 | Kurisawa | C09K 19/42 349/43 |
| 2016/0187739 | A1* | 6/2016 | Iwata | G02F 1/134363 349/42 |

FOREIGN PATENT DOCUMENTS

| | | |
|---|---|---|
| CN | 101097307 | 1/2008 |
| CN | 102033369 A | 4/2011 |
| CN | 103311253 A | 9/2013 |
| CN | 203825339 U | 9/2014 |

OTHER PUBLICATIONS

Office Action in Chinese Application No. 201410158760.5 dated Dec. 27, 2016, with English translation. 10 pages.
International Search Report and Written Opinion with English Language Translation, dated Jan. 19, 2015, Application No. PCT/CN2014/083309.
Chinese Office Action with English Language Translation, dated Feb. 15, 2016, Chinese Application No. 201410158760.5.
Decision on Rejection in Chinese Application No. 201410158760.5 dated Jun. 8, 2017, with English translation.

* cited by examiner

SLIT ELECTRODE, ARRAY SUBSTRATE AND DISPLAY DEVICE

FIELD OF THE INVENTION

The present invention relates to the field of display technology, particularly to a slit electrode, an array substrate comprising the slit electrode and a display device.

BACKGROUND OF THE INVENTION

At present, the display modes of the Thin Film Transistor Liquid Crystal Display (TFT-LCD) mainly include Twisted Nematic (TN) mode, Vertical Alignment (VA) mode, In-Plane-Switching (IPS) mode and Advanced Super Dimension Switch (ADS) mode or the improved technologies thereof etc.

No matter which mode the thin film transistor liquid crystal display is, the display principle is forming an electric field between the pixel electrode and the common electrode, the electric field deflecting the liquid crystal molecules to realize bright and dark display of images.

In order to reduce capacitance between the opposite overlapping surfaces of the pixel electrode and the common electrode, the pixel electrode and/or the common electrode in the prior art are fabricated as slit electrodes, so as to reduce the opposite overlapping surfaces of the pixel electrode and the common electrode, and can further increase light transmission rate of the pixel.

Take the pixel electrode as the example, referring to FIG. 1, which shows a pixel electrode 10 provided by the prior art.

The pixel electrode 10 is provided with a plurality of slits, the electrodes between adjacent slits are strip electrodes, the widths of the strip electrodes 100 are consistent which are all d. The process margin for fabricating the pixel electrode 10 as shown in FIG. 1 is relatively low.

The so-called process margin refers to the process interval in which the product performance meets the requirement. For example, in the prior art, once change of the width of the strip electrode is >0.2 μm, the product performance cannot meet the requirement, the 0.2 μm is called "process margin". The process margin reflects the general discrete degree of the quality characteristic value of the product processed by a certain process under the stable state. The product quality is a comprehensive manifestation of the process margin, that is to say, under the standard conditions of the operator, the machine, the raw material, the operating method, the measurement method and the environment and so on, the required machining accuracy when the working procedure is in the stable state.

SUMMARY OF THE INVENTION

In order to solve the problem of a relative low process margin of the existing slit electrode, an aspect of the present invention provides a slit electrode.

According to an embodiment of the present invention, a slit electrode comprises: at least one slit electrode unit, the slit electrode unit comprising a plurality of strip electrodes, a slit being provided between two adjacent strip electrodes; wherein each strip electrode has a given average width, the average widths of at least two strip electrodes in the slit electrode unit are not equal.

According to another embodiment of the present invention, the average widths of any two strip electrodes in the slit electrode unit are not equal, the average widths of respective strip electrodes increase or decrease progressively according to arrangement sequence.

According to another embodiment of the present invention, the difference value between the average widths of every two adjacent strip electrodes is constant; the average widths of respective strip electrodes in the slit electrode unit are in a range of 2~4 μm.

According to another embodiment of the present invention, the width of the strip electrode is equal everywhere, or the width of the strip electrode increases or decreases progressively according to its own extending direction.

According to another embodiment of the present invention, the slit electrode comprises two slit electrode units, the strip electrodes on the two slit electrode units are in mirror image arrangement.

According to another embodiment of the present invention, the extending directions of respective strip electrode in each slit electrode unit are parallel to one another, or the extending directions of two adjacent strip electrodes have a given angle.

According to another embodiment of the present invention, the extending directions of two adjacent strip electrodes have a given angle; wherein the slit electrode unit comprises a first strip electrode group consisting of strip electrodes extending along a first direction, and a second strip electrode group consisting of strip electrodes extending along a second direction; the strip electrodes in the first strip electrode group and the strip electrodes in the second strip electrode group are arranged alternately.

According to another embodiment of the present invention, the slit electrode comprises two slit electrode units, the extending directions of respective strip electrodes in each slit electrode unit are parallel to one another; wherein the respective strip electrodes of one of the two slit electrode units extend along a first direction, the respective strip electrodes of the other of the two slit electrode units extend along a second direction.

From the software simulation result it can be seen that the process margin of the slit electrode provided by respective embodiments of the present invention is higher than the slit electrode of the prior art.

Another aspect of the present invention provides an array substrate comprising said slit electrode.

According to an embodiment of the present invention, an array substrate comprises: sub-pixel units in array arrangement, the sub-pixel unit comprising a common electrode and a pixel electrode insulated from each other, at least one of the common electrode and the pixel electrode being a slit electrode provided by any one of said respective embodiments of the present invention.

According to another embodiment of the present invention, the common electrode and the pixel electrode are located in different layers, the two are insulated from each other through an insulating layer.

According to another embodiment of the present invention, the common electrode and the pixel electrode are slit electrodes; the strip electrodes in the common electrode and the strip electrodes in the pixel electrode are arranged alternately when being viewed from a direction perpendicular to the array substrate, there is no overlapping region between the two.

According to another embodiment of the present invention, the common electrode and the pixel electrode are arranged in the same layer, the strip electrodes in the common electrode and the strip electrodes in the pixel electrode are arranged alternately.

Another aspect of the present invention provides a display device, the display device comprising an array substrate provided by any one of said respective embodiments of the present invention.

The present invention provides a slit electrode, comprising: at least one slit electrode unit, the slit electrode unit comprising a plurality of strip electrodes, a slit being provided between two adjacent strip electrodes; wherein each strip electrode has a given average width, the average widths of at least two strip electrodes in the slit electrode unit are not equal. Such an arrangement can improve accuracy range of fabricating the slit electrode and increase process margin of the slit electrode. When fabricating said slit electrode, the accuracy range in the fabricating process thereof is relatively broad, the process margin of the slit electrode is relatively high.

DETAILED DESCRIPTION OF THE INVENTION

An aspect of the present invention provides a slit electrode, so as to solve the problem of a relative low process margin of the existing slit electrode. Another aspect of the present invention provides an array substrate comprising the slit electrode. A further aspect of the present invention provides a display device comprising the array substrate.

Next, the respective embodiment provided by the present invention will be explained with reference to the drawings.

Figure 1:
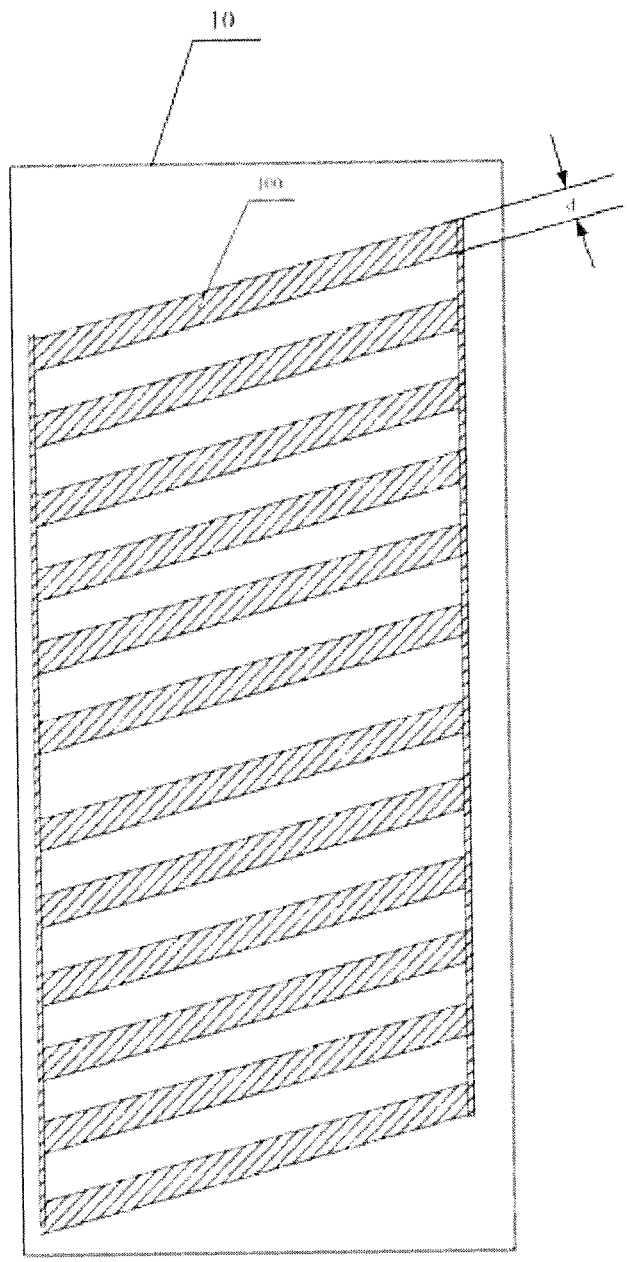
FIG. 1 is a structural schematic view of a pixel electrode provided by the prior art.
Figure 2:
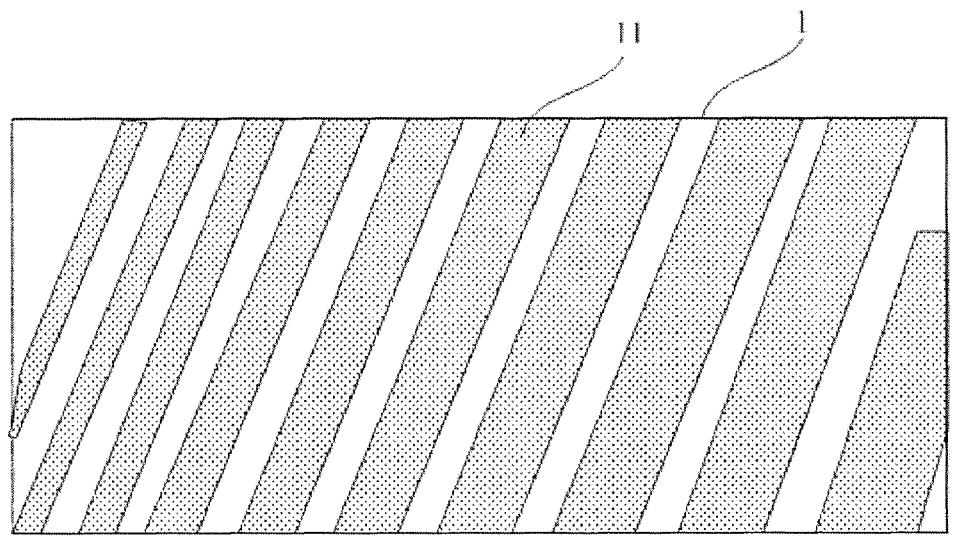
FIG. 2 is a structural schematic view of a slit electrode provided by an embodiment of the present invention.
Figure 3:
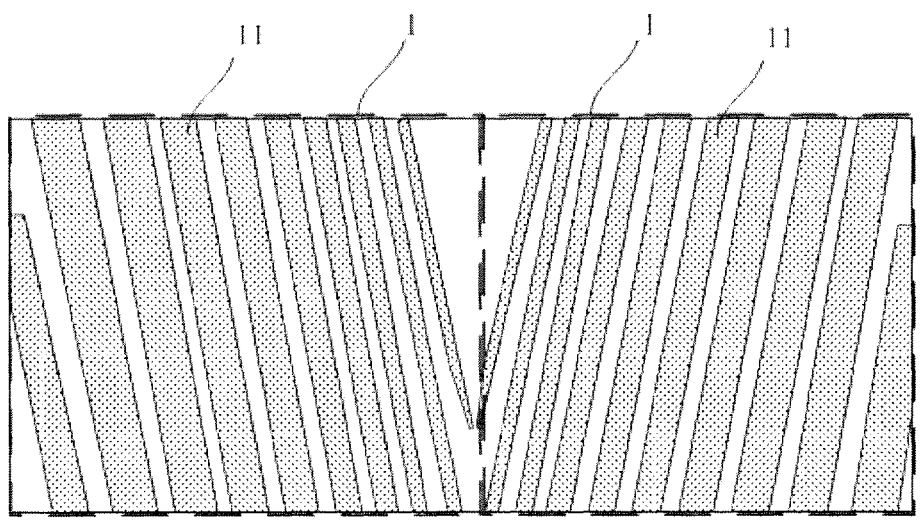
FIG. 3 is a structural schematic view of a slit electrode provided by another embodiment of the present invention.

Referring to FIG. 2 and FIG. 3, the slit electrode provided by the embodiment of the present invention comprises: at least one slit electrode unit 1. The slit electrode unit 1 comprises: a plurality of strip electrodes 11, a slit being provided between two adjacent strip electrodes 11; wherein each strip electrode 11 has a given average width, the average widths of at least two strip electrodes 11 in each slit electrode unit 1 are not equal.

The slit electrode as shown in FIG. 2 comprises a slit electrode unit 1; the slit electrode as shown in FIG. 3 comprises two slit electrode units 1.

From the slit electrode as shown in any one of FIG. 2 and FIG. 3 it can be seen that the average widths of the strip electrodes 11 are not completely equal. That is to say, the average widths of at least two strip electrodes are not equal, the average width of one of the at least two strip electrodes is a first average width, the average width of the other is a second average width.

The average widths of at least two strip electrodes in the slit electrode unit according to this embodiment are not equal, such an arrangement can improve accuracy range of fabricating the slit electrode and increase process margin of the slit electrode. When fabricating said slit electrode, the accuracy range in the fabricating process thereof is relatively broad, the process margin of the slit electrode is relatively high.

In order to illustrate that the slit electrode provided by the embodiment of the present invention has a relatively high process margin, the present invention performs simulation test through software. Take the example that the slit electrode is a pixel electrode, a liquid crystal display panel of two structures is designed, which corresponds to the following embodiment and comparison example:

Embodiment: the liquid crystal display panel meets the requirement that: the average width of each strip electrode is not equal to the average width of any of other strip electrodes, other structures of the liquid crystal display panel except for the pixel electrode are same as the structures of the liquid crystal display panel in the comparison example; the average widths of the strip electrodes according to the arrangement sequence are successively: 2.0 µm, 2.2 µm, 2.4 µm, 2.6 µm, 2.8 µm.

Comparison example: the liquid crystal display panel meets the requirement that: the average width of each strip electrode is equal to the average width of any of other strip electrodes, which is 2.4 µm.

The simulation test is performed on the process margin of the slit electrodes in the embodiment and the comparison example, and simulation test is also performed on the light transmission rate of the slit electrode and the capacitance storage rate between the slit electrode and the common electrode, the obtained simulation test result is as shown in the following Table I.

TABLE I

Simulation result of the process margin, the light transmission rate and the capacitance storage rate of the slit electrode

|  | Embodiment | Comparison example |
| --- | --- | --- |
| Process margin | 0.4 µm | 0.2 µm |
| Light transmission rate | 98% | 98% |
| Capacitance storage rate | 35% | 35% |

Figure 4:
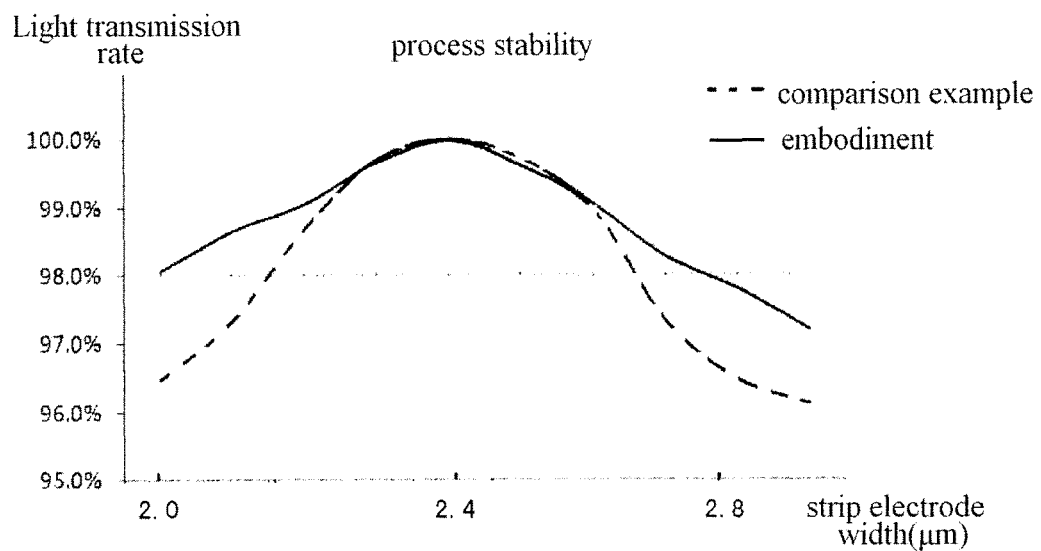
FIG. 4 is a relationship diagram of the light transmission rate of a products versus the strip electrode width corresponding to the embodiment of the present invention and the comparison example respectively.

FIG. 4 is a relationship diagram of the light transmission rate of the products versus the strip electrode width to which said embodiment and the comparison example correspond.

When the light transmission rate of the product meets the requirement, the process variation range of the comparison example is 2.2~2.6 µm, which can be represented as 2.4±0.2 µm, the process variation range of the embodiment according to the present invention is 2.0~2.8 µm, which can be represented as 2.4±0.4 µm. The accuracy range for fabricating the slit electrode is increased by about two times, the process margin is increased. Accepted products whose light transmission rate meets the requirement can be more easily obtained when the products are in mass production, thereby saving the cost.

In the slit electrode as shown in FIG. 2 and FIG. 3, the average width of any of the strip electrodes 11 in the slit electrode unit 1 is not completely equal to the average width of other strip electrodes 11, and there are more implementing modes.

For example, according to the arrangement sequence of the respective strip electrodes 11 in each slit electrode unit, the average width of the strip electrode varies once every n strip electrodes, wherein n is a positive integer.

The widths of the respective strip electrodes in the slit electrode unit may increase or decrease progressively according to the arrangement sequence. According to the arrangement sequence, the light transmission rates of the regions to which the respective strip electrodes correspond increase or decrease progressively, the variation tendency of the light transmission rate is consistent, therefore, the problem that the light transmission rate of a certain region is relatively large suddenly and the light transmission rate of another certain region is relatively small will not occur visually, thereby achieving the purpose of a better display effect.

The difference value between the average widths of every two adjacent strip electrodes may be constant.

The average widths of respective strip electrodes in the slit electrode unit are in a range of 2~4 μm. In specific implementation, the following implementing modes may be adopted: the widths of the strip electrodes according to the arrangement sequence may be successively 2.2 μm, 2.4 μm, 2.6 μm, 2.8 μm, 3.0 μm etc; or may be 2.3 μm, 2.5 μm, 2.7 μm, 2.9 μm, 3.1 μm, etc; or may also be 2.1 μm, 2.3 μm, 2.5 μm, 2.7 μm, 2.9 μm etc.

From the strip electrodes provided by said embodiment, the skilled person in the art can understand that the whole structure of the strip electrode is in strip shaped arrangement, the width of the strip electrode is equal everywhere, or the width of the strip electrode increases or decreases progressively according to its own extending direction.

That is to say, the two long sides of the pattern of the strip electrode are straight lines, the two long sides are parallel to each other or are not parallel.

On the basis of any one of the above implementing modes, the slit electrode as shown in FIG. 3 can be designed, i.e., the slit electrode comprises two slit electrode units 1, the strip electrodes 11 in the two slit electrode unit 1 are in mirror image arrangement.

The larger the average width of the strip electrode in the slit electrode unit is, the smaller the light transmission rate is, the smaller the average width of the strip electrode is, the larger the light transmission rate is. When the strip electrodes on the two slit electrode units are in mirror image arrangement, if the average widths of respective strip electrodes arranged from the edge to the center in one slit electrode unit increase progressively (or decrease progressively) in sequence, the average widths of respective strip electrodes arranged from the edge to the center in the other slit electrode unit also increase progressively (or decrease progressively) in sequence. Therefore, the light transmission rate of the slit electrode decreases progressively (or increases progressively) from the edge to the center gradually, the light transmission rate of the slit electrode varies regularly in a slight gradient, the light transmission rate of the slit electrode on the whole would not vary abruptly, and would not influence the display effect of the image. Moreover, the average width of the strip electrode of the present invention is in a few microns order of magnitude, for example, the average width range is 2~4 μm, the width difference value between the strip electrodes is in a range of about 0.2~0.5 μm, the variation range of the average width of the strip electrode occupies about 1/10 of the average width of the strip electrode, besides, the width range of the strip electrode is relatively broad, the strip electrode with a relatively small average width increases local light transmission rate compared with the prior art, the strip electrode with a relatively large average width reduces the local light transmission rate compared with the prior art, on the whole, the light transmission rate of the pixel region to which the same slit electrode unit corresponds would not change greatly compared with the light transmission rate to which the strip electrode arrangement of the same average width of the prior art corresponds.

The average spacing between every two adjacent strip electrodes may be constant, so as to ensure the light transmission rate to be more uniform.

In the slit electrode of any of the above implementing modes, the extending directions of respective strip electrodes in the slit electrode unit are parallel to one another, or the extending directions of two adjacent strip electrodes have a given angle.

Figure 5:
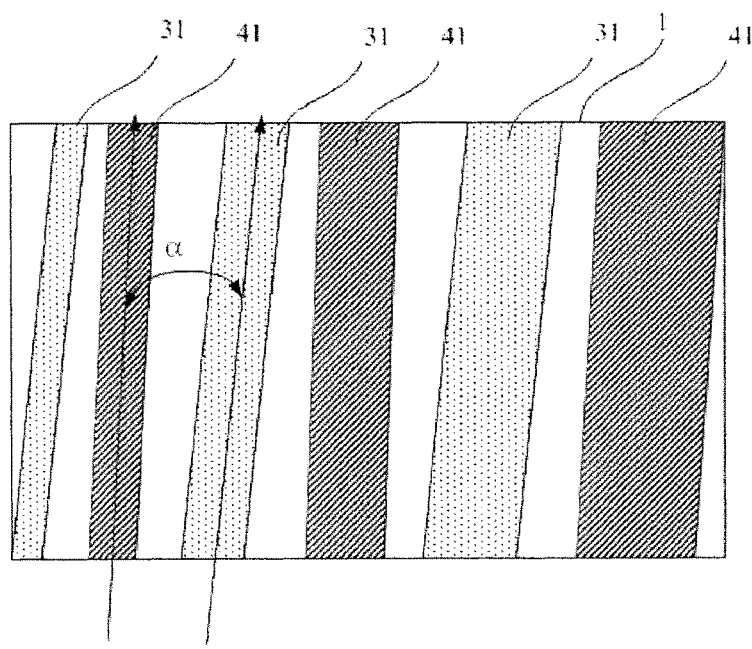
FIG. 5 is a structural schematic view of a slit electrode provided by a further embodiment of the present invention.

Referring to FIG. 5, the extending directions of two adjacent strip electrodes have a given angle α, when the slit electrode is a common electrode (or a pixel electrode), the electric field directions between the strip electrodes arranged in different directions and the pixel electrode (or the common electrode) are different, the deflection directions of the liquid crystal molecules close to the strip electrodes arranged in different directions are different, thus the view angle range of the liquid crystal display device can be increased, so as to achieve the purpose of wide view angle display.

Specifically, the slit electrode unit 1 comprises a first strip electrode group consisting of first strip electrodes 31 extending along a first direction, and a second strip electrode group consisting of second strip electrodes 41 extending along a second direction.

The first strip electrodes 31 in the first strip electrode group and the second strip electrodes 41 in the second strip electrode group are arranged alternately, so as to ensure two adjacent strip electrodes to be arranged in different directions. The deflection directions of the liquid crystal molecules close to the two adjacent strip electrodes are different, which further increases the view angle range of the liquid crystal display device.

In FIG. 5, the line segment with a single headed arrow represents the extending direction of the strip electrode. The line segment with a double headed arrow represents the angle of the extending directions of the strip electrodes. The range of the angle α between the first direction and the second direction is 3~20°. For example, the angle between the first direction and the second direction may be 3~11°.

Figure 6:
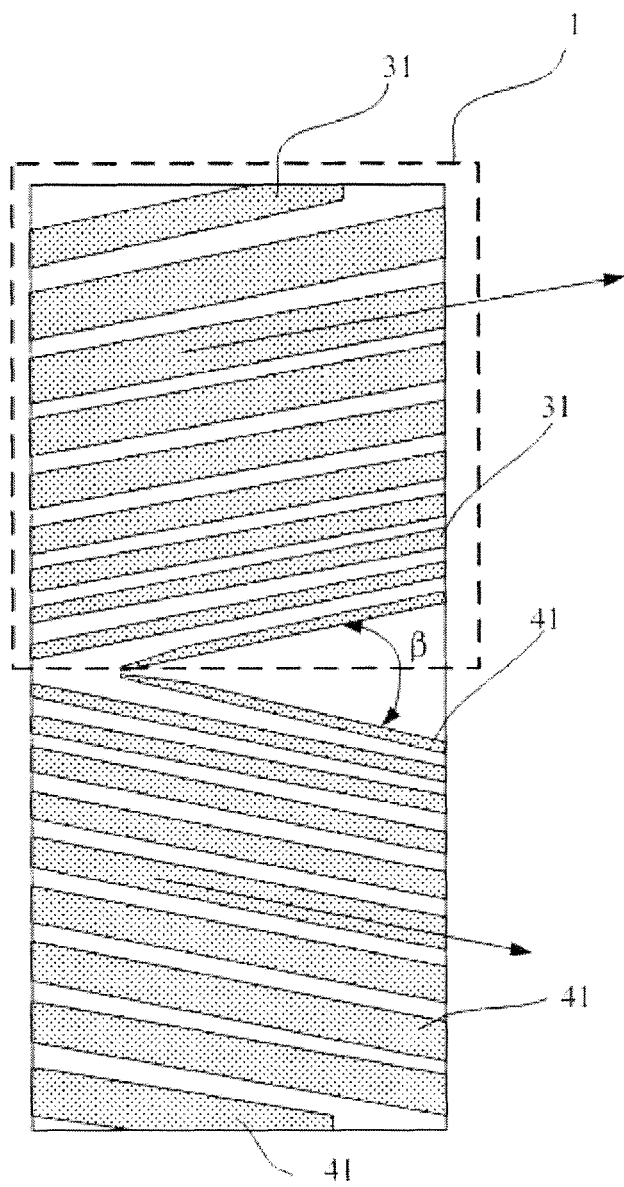
FIG. 6 is a structural schematic view of a slit electrode provided by yet another embodiment of the present invention.

Referring to FIG. 6, the slit electrode comprises two slit electrode units 1, the extending directions of respective strip electrodes in each of the slit electrode units 1 are parallel to one another. The respective first strip electrodes 31 in one of the two slit electrode units 1 extend along the first direction, the respective second strip electrodes 41 in the other extend along the second direction.

In FIG. 6, the line segment with a single headed arrow represents the extending direction of the strip electrode. The line segment with a double headed arrow represents the angle of the extending directions of the strip electrodes. The angle between the first direction and the second direction is β.

The ends of the respective strip electrodes in the slit electrode located at the same side can be electrically connected through leads.

The slit electrode may be a common electrode and/or a pixel electrode in the liquid crystal display panel.

In specific implementation, a DC signal is applied to the common electrode, a gray scale signal is applied to the pixel electrode, an electric field is generated between the two to control deflection of the liquid crystal molecules so as to realize image display.

An aspect of the present invention provides an array substrate, comprising: sub-pixel units in array arrangement, the sub-pixel unit comprising a common electrode and a pixel electrode, at least one of the common electrode and the pixel electrode being a slit electrode as stated above.

Figure 7:
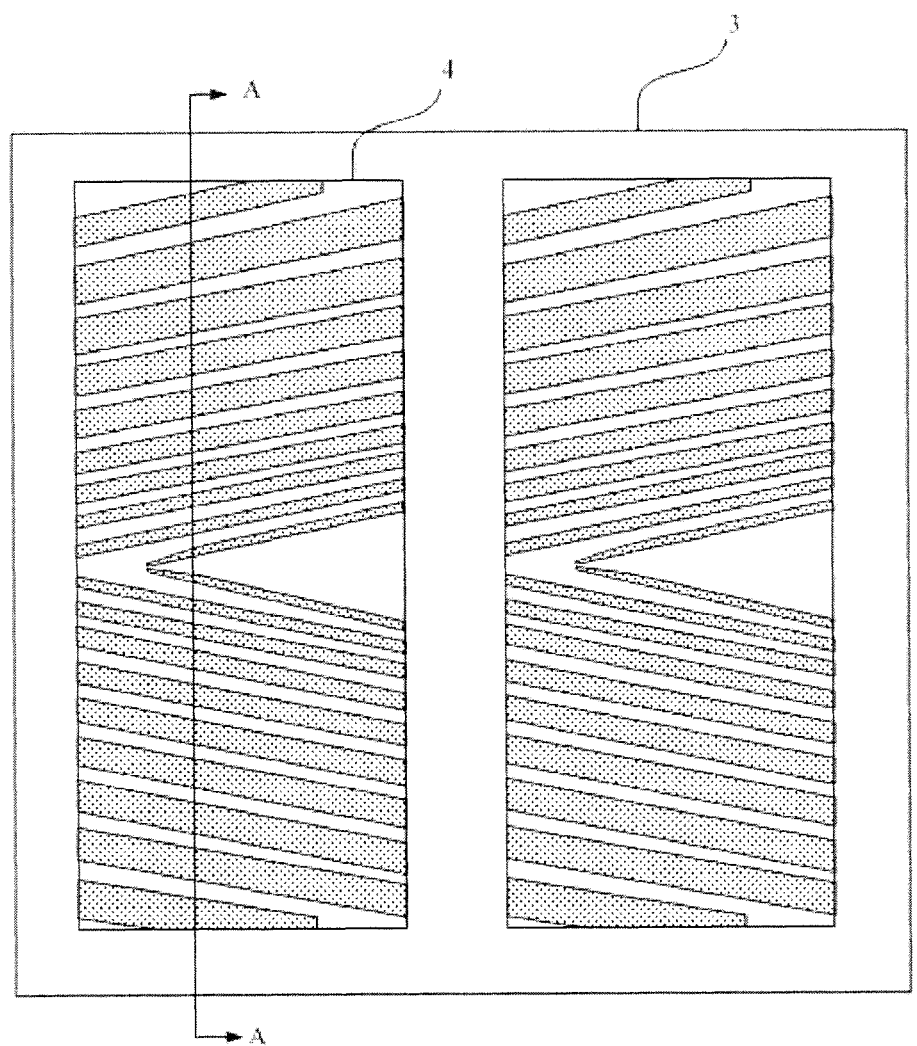
FIG. 7 is a structural schematic view of a pixel electrode and a common electrode in a display device provided by an embodiment of the present invention.
Figure 8:
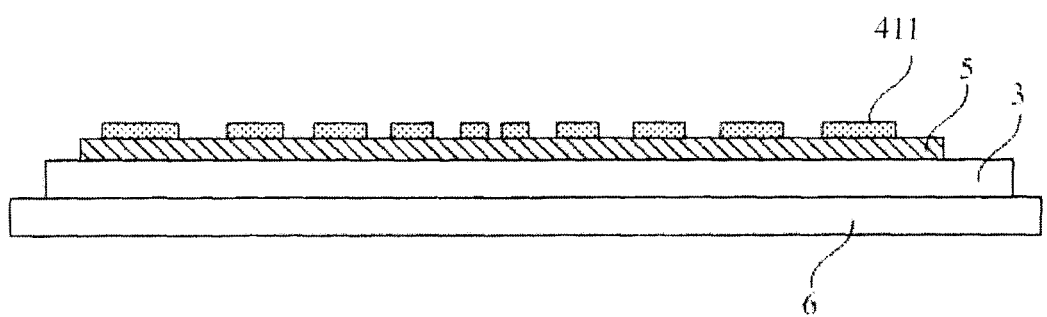
FIG. 8 is a sectional view of the pixel electrode and the common electrode as shown in FIG. 7 in AA direction.

The common electrode and the pixel electrode on the array substrate at least include the following implementing modes:

Implementing mode I: referring to FIG. 7 and FIG. 8, FIG. 7 is a structural schematic view of a pixel electrode and a common electrode in a display device provided by an embodiment of the present invention, FIG. 8 is a sectional view of the pixel electrode and the common electrode as shown in FIG. 7 in AA direction.

The common electrode 3 and the pixel electrode 4 on the substrate 6 are located in different layers, the common electrode 3 is located below the pixel electrode 4, the two are insulated from each other through an insulating layer 5, the pixel electrode 4 is a slit electrode provided by respective embodiments of the present invention, the pixel electrode 4 comprises pixel strip electrodes 411 between the slits, the common electrode 3 is a planar electrode.

Implementing mode II: the common electrode and the pixel electrode are located in different layers, the common electrode is located above the pixel electrode, the two are insulated from each other through an insulating layer, the common electrode is a slit electrode provided by respective embodiments of the present invention, the pixel electrode is a planar electrode.

Figure 9:
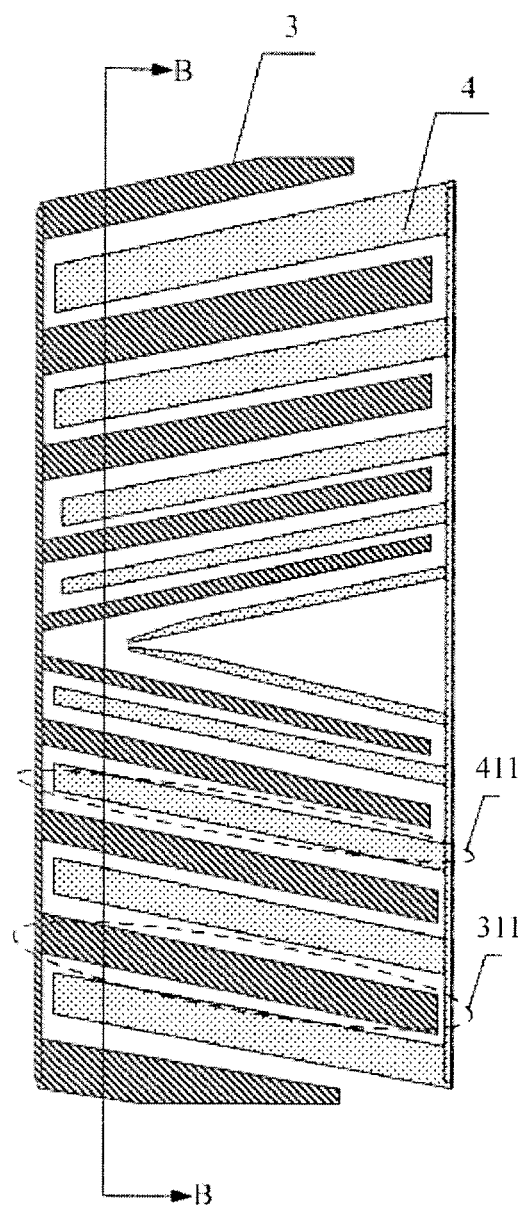
FIG. 9 is a structural schematic view of a display device provided by another embodiment of the present invention.
Figure 10:
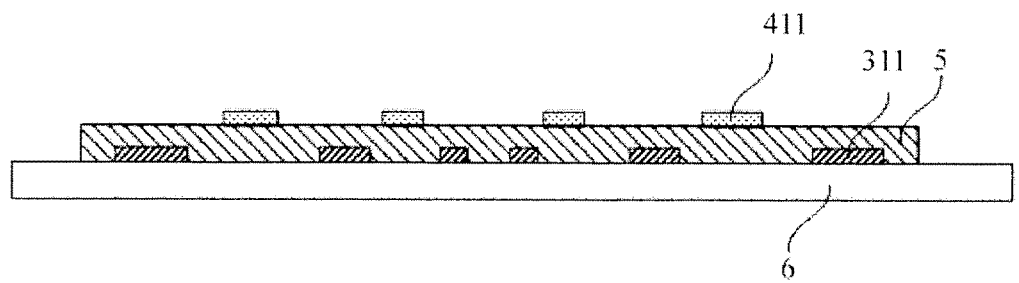
FIG. 10 is a sectional view of FIG. 9 in BB direction.

Implementing mode III: Referring to FIG. 9 and FIG. 10, FIG. 9 is a vertical schematic view of the common electrode 3 and the pixel electrode 4, FIG. 10 is a sectional view of FIG. 9 in BB direction, wherein the common electrode 3 and the pixel electrode 4 are located in different layers, the common electrode 3 is located below the pixel electrode 4, the two are insulated from each other through an insulating layer 5, the pixel electrode 4 and the common electrode 3 are both the slit electrode provided by respective embodiments of the present invention.

Specifically, the pixel electrode 4 comprises a plurality of pixel strip electrodes 411, the common electrode 3 comprises a plurality of common strip electrodes 311.

There may be overlapping regions between the common strip electrodes 311 and the pixel strip electrodes 411, there may also be no overlapping regions therebetween. There is no overlapping region between the common strip electrodes 311 and the pixel strip electrodes 411 as shown in FIG. 9 and FIG. 10.

Figure 11:
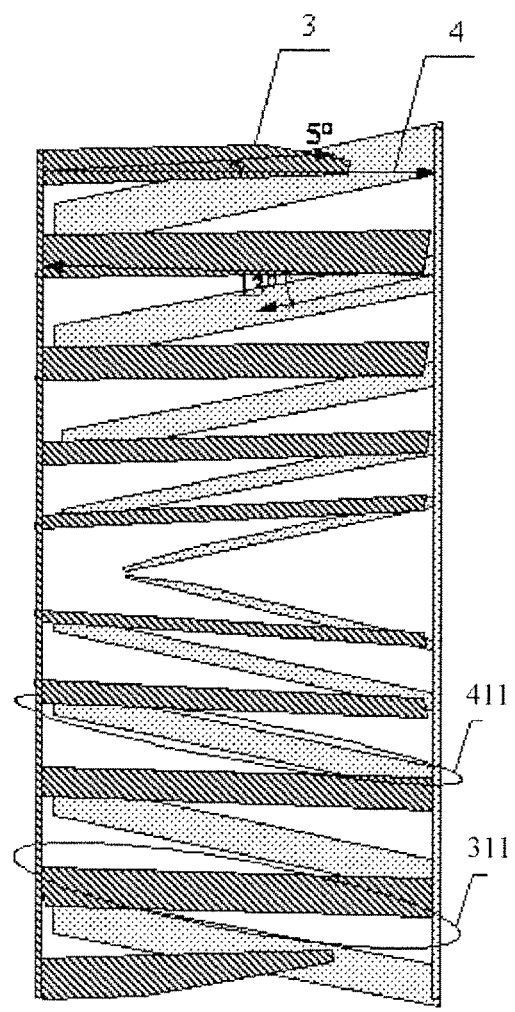
FIG. 11 is a structural schematic view of a display device provided by a further embodiment of the present invention.

When there are overlapping regions between the common strip electrodes 311 and the pixel strip electrodes 411, one of the implementing modes is: as shown in FIG. 11, the respective common strip electrodes 311 may be arranged to be tilted 5° relative to an edge of the rectangular pixel unit, the respective pixel strip electrodes 411 are tilted 13° relative to the edge of the rectangular pixel unit. The angle between the common strip electrodes 311 and the pixel strip electrodes 411 is about 8°. This angle ensures the common strip electrodes 311 and the pixel strip electrodes 411 to be almost parallel, which would not result in phenomenon of dark state light leakage of the liquid crystal display device. When the angle between the common strip electrodes 311 and the pixel strip electrodes 411 is too large or the tilted angles between the common strip electrodes 311 as well as the pixel strip electrodes 411 and the edge of the pixel unit are too large, under the same electric field intensity, the problems of small light transmission rate, nonuniform image brightness, large color cast may easily occur.

Implementing mode IV: the common electrode and the pixel electrode are located in different layers, the common electrode is located above the pixel electrode, the two are insulated from each other through an insulating layer, the pixel electrode and the common electrode are both the slit electrode produced by respective embodiments of the present invention. Preferably, the projections of the common electrode and the pixel electrode on the array substrate have no overlapping regions.

Compared with the implementing mode I and the implementing mode II, the implementing mode III and the implementing mode IV reduce the opposite overlapping area between the pixel electrode and the common electrode, and reduce the opposite electric field between the two, thereby reducing the capacitance between the two, and improving image display efficiency. Since the common electrode and the pixel electrode are located in different layers, and both are slit electrodes, the slits in the common electrode and the slits in the pixel electrode will be relatively wide, the process margin for fabricating the common electrode and the pixel electrode will be increased significantly.

Implementing mode V: Referring to FIG. 9, the common electrode 3 and the pixel electrode 4 are both the slit electrode provided by respective embodiments of the present invention.

Figure 12:
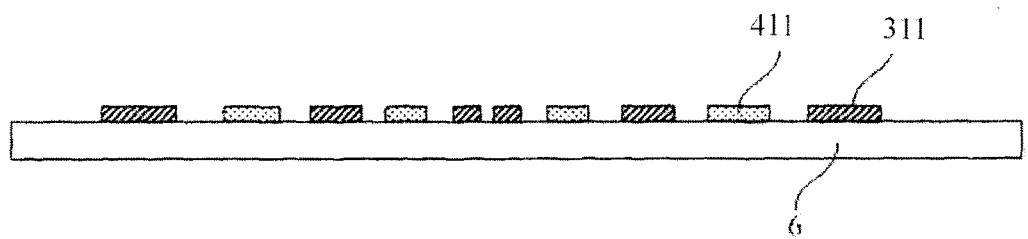
FIG. 12 is another sectional view of FIG. 9 in BB direction.

Referring to FIG. 12 which is a second sectional view of FIG. 9 in BB direction, wherein the common electrode 3 and the pixel electrode 4 are arranged in the same layer.

The common strip electrodes 311 in the common electrode 3 and the pixel strip electrodes 411 in the pixel electrode 4 are arranged alternately, and remain insulated from one another.

The average widths of the common strip electrodes 311 in the common electrode 3 and the pixel strip electrodes 411 in the pixel electrode 4 may be unequal. The average widths of respective common strip electrodes 311 and pixel strip electrodes 411 increase or decrease progressively according to the arrangement sequence.

The process variation range of the arrangement manner of the above pixel electrode and common electrode provided by the embodiment of the present invention is relatively large because the common electrode and/or the pixel electrode thereof are the slit electrode provided above, the accuracy range for fabricating the slit electrode is increased by about two times, the process margin is increased. Accepted products whose light transmission rate meets the requirement can be more easily obtained when the products are in mass production, thereby saving the cost.

Another aspect of the present invention further provides a display device comprising an array substrate provided by respective embodiments of the present invention.

Specifically, the display device comprises a first substrate and a second substrate arranged oppositely, one of the first substrate and the second substrate is a substrate comprising a pixel electrode and a common electrode, the other is a substrate comprising a black matrix and a color filter, at least one of the pixel electrode and the common electrode is a slit electrode provided by any of the respective embodiments of the present invention.

Alternatively, the display device comprises: a first substrate and a second substrate arranged oppositely, one of the first substrate and the second substrate is a substrate comprising a pixel electrode, a common electrode, a black matrix and a color filter; a liquid crystal layer is arranged between the first substrate and the second substrate; at least one of the pixel electrode and the common electrode is a slit electrode provided by any of the respective embodiments of the present invention.

The display device may also be: on the basis of the display devices of the above two structures, further comprising: a pixel electrode and a common electrode arranged on a substrate opposite to the substrate where the pixel electrode and the common electrode locate.

Of course, the display devices provided by respective embodiments of the present invention are only several enumerated examples, any display devices comprising the slit electrode provided by respective embodiments of the present invention fall within the scope of the present invention.

The display devices provided by respective embodiments of the present invention may be display devices such as a liquid crystal display panel, a liquid crystal display, a liquid TV.

An aspect of the present invention provides a slit electrode, comprising: at least one slit electrode unit, the slit electrode unit comprising a plurality of strip electrodes; wherein the average widths of respective strip electrodes in the slit electrode unit are not completely the same. Such a setting of the slit electrode can increase accuracy range of the slit electrode, and increase process margin of the slit electrode. From verification it can be seen that when the slit electrode provided by the present invention is used for fabricating the common electrode and/or the pixel electrode, and when the light transmission rate reaches 98%, the accuracy range for fabricating the slit electrode is increased by about two times, the process margin is increased. Accepted products whose light transmission rate meets the requirement can be more easily obtained when the products are in mass production, thereby saving the cost.

Apparently, the skilled person in the art can make various modifications and variants to the present invention without departing from the spirit and scope of the present invention. In this way, provided that these modifications and variants of the present invention belong to the scopes of the claims of the present invention as well as the equivalent technologies, the present invention also intends to cover these modifications and variants.

The invention claimed is:

1. A slit electrode comprising: at least one slit electrode unit, the slit electrode unit comprising a plurality of strip electrodes, a slit being provided between two adjacent strip electrodes,
wherein each strip electrode has a given average width,
wherein the average widths of any two strip electrodes are not equal, the average widths of respective strip electrodes increase or decrease progressively according to arrangement sequence, and
wherein the difference value between the average widths of every two adjacent strip electrodes is constant, the average widths of respective strip electrodes in the slit electrode unit are in a range of 2~4 μm, the difference value between the average widths of every two adjacent strip electrodes is in a range of 0.2~0.5 μm.

2. The slit electrode according to claim 1, characterized in that the width of the strip electrode is equal everywhere.

3. The slit electrode according to claim 1, characterized in that the slit electrode comprises two slit electrode units, the strip electrodes on the two slit electrode units are in mirror image arrangement with one another.

4. The slit electrode according to claim 1, characterized in that the extending directions of respective strip electrode in each slit electrode unit are parallel to one another.

5. The slit electrode according to claim 4, characterized in that the extending directions of two adjacent strip electrodes have a given angle;
wherein the slit electrode unit comprises a first strip electrode group consisting of strip electrodes extending along a first direction, and a second strip electrode group consisting of strip electrodes extending along a second direction;
the strip electrodes in the first strip electrode group and the second strip electrode group are arranged alternately.

6. The slit electrode according to claim 5, characterized in that the angle between the first direction and the second direction is 3~20°.

7. The slit electrode according to claim 4, characterized in that the slit electrode comprises two slit electrode units, the extending directions of respective strip electrodes in each slit electrode unit are parallel to one another;
wherein the respective strip electrodes of one of the two slit electrode units extend along a first direction, the respective strip electrodes of the other of the two slit electrode units extend along a second direction.

8. An array substrate, characterized in that, comprising: sub-pixel units in array arrangement, the sub-pixel unit comprising a common electrode and a pixel electrode insulated from each other, at least one of the common electrode and the pixel electrode being a slit electrode, the slit electrode comprising:
at least one slit electrode unit, the slit electrode unit comprising a plurality of strip electrodes, a slit being provided between two adjacent strip electrodes;
wherein each strip electrode has a given average width, the average widths of any two strip electrodes are not equal, the average widths of respective strip electrodes increase or decrease progressively according to arrangement sequence, and
wherein the difference value between the average widths of every two adjacent strip electrodes is constant, the average widths of respective strip electrodes in the slit electrode unit are in a range of 2~4 μm, the difference value between the average widths of every two adjacent strip electrodes is in a range of 0.2~0.5 μm.

9. The array substrate according to claim 8, characterized in that the common electrode and the pixel electrode are located in different layers, the two are insulated from each other through an insulating layer.

10. The array substrate according to claim 9, characterized in that the common electrode and the pixel electrode are slit electrodes; the strip electrodes in the common electrode and the strip electrodes in the pixel electrode are arranged alternately when being viewed from a direction perpendicular to the array substrate.

11. The array substrate according to claim 9, characterized in that the slit electrode comprises two slit electrode units, the strip electrodes on the two slit electrode units are in mirror image arrangement with one another.

12. The array substrate according to claim 8, characterized in that the common electrode and the pixel electrode are arranged in the same layer and are both slit electrodes, the strip electrodes in the common electrode and the strip electrodes in the pixel electrode are arranged alternately.

13. The array substrate according to claim 8, characterized in that the extending directions of respective strip electrode in each slit electrode unit are parallel to one another.

14. A display device, characterized in that, comprising an array substrate, the array substrate comprising:
   sub-pixel units in array arrangement, the sub-pixel unit comprising a common electrode and a pixel electrode insulated from each other, at least one of the common electrode and the pixel electrode being a slit electrode, the slit electrode comprising: at least one slit electrode unit,
   at least one slit electrode unit, the slit electrode unit comprising a plurality of strip electrodes, a slit being provided between two adjacent strip electrodes;
   wherein each strip electrode has a given average width, the average widths of any two strip electrodes are not equal, the average widths of respective strip electrodes increase or decrease progressively according to arrangement sequence, and
   wherein the difference value between the average widths of every two adjacent strip electrodes is constant, the average widths of respective strip electrodes in the slit electrode unit are in a range of 2~4 μm, the difference value between the average widths of every two adjacent strip electrodes is in a range of 0.2~0.5 μm.

15. The display device according to claim 14, characterized in that the common electrode and the pixel electrode are located in different layers, the two are insulated from each other through an insulating layer.

16. The display device according to claim 14, characterized in that the common electrode and the pixel electrode are arranged in the same layer and are both slit electrodes, the strip electrodes in the common electrode and the strip electrodes in the pixel electrode are arranged alternately.

* * * * *